Nov. 4, 1969 R. E. MARTIN 3,476,436
DETACHABLE CLEAR VIEW VISOR FOR MOTOR VEHICLES
Filed Feb. 15, 1968
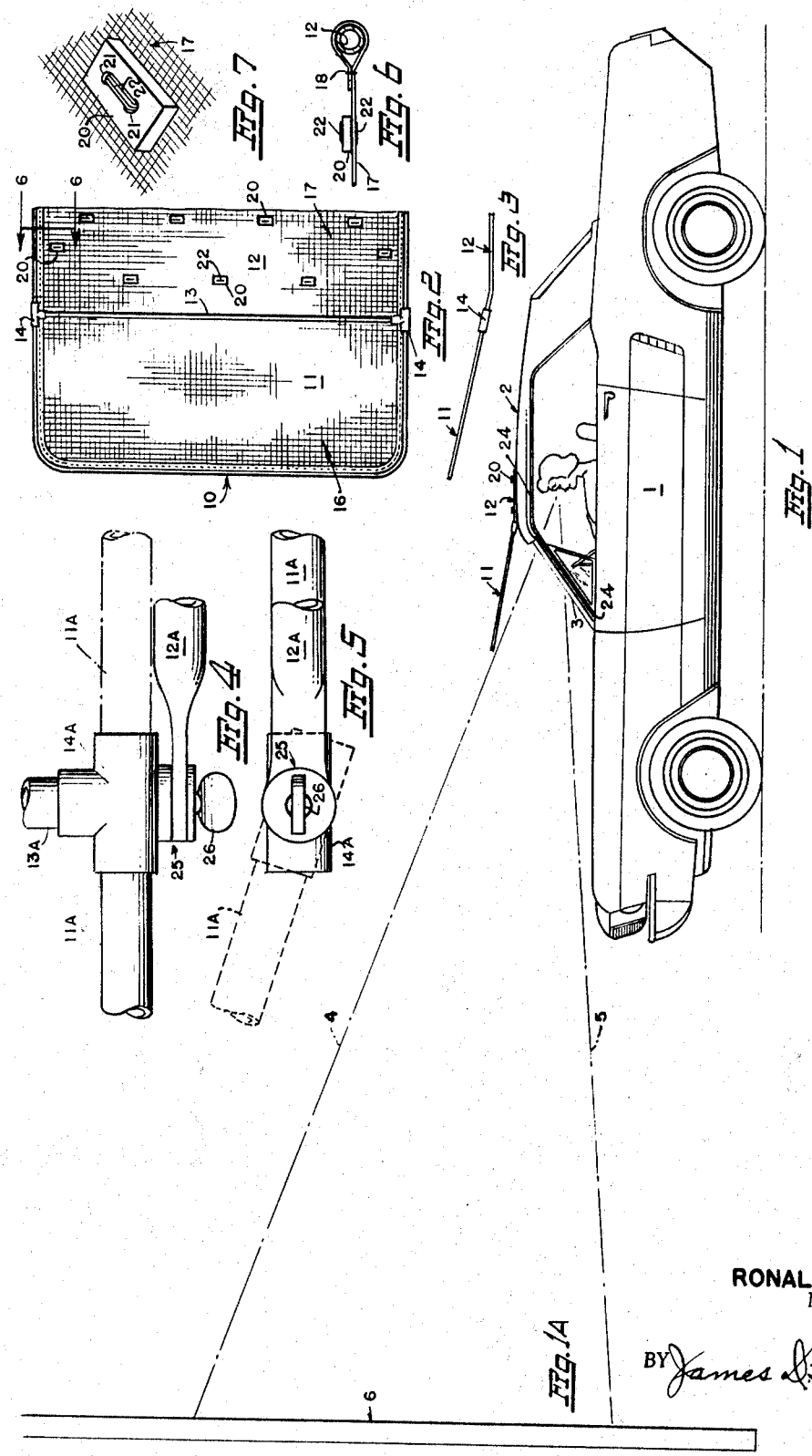
RONALD E. MARTIN
INVENTOR.
BY James D. Girnan
ATT'Y

United States Patent Office 3,476,436
Patented Nov. 4, 1969

3,476,436
DETACHABLE CLEAR VIEW VISOR FOR MOTOR VEHICLES
Ronald E. Martin, 1784 40th Place SE.,
Salem, Oreg. 97302
Filed Feb. 15, 1968, Ser. No. 705,806
Int. Cl. B60j 3/02
U.S. Cl. 296—95   2 Claims

ABSTRACT OF THE DISCLOSURE

A visor for passenger vehicles adapted for quick and convenient attachment to or removal from the roof of a vehicle and of such forward and lateral dimensions as to overhang the windshield in a forwardly elevated position without interfering with the normal line of vision of a vehicle passenger. The visor includes a frame with a covering of plastic material and is secured to the vehicle by magnets.

---

This invention relates generally to visors for automotive vehicles and more particularly to one especially, though not restrictively, adapted for use in drive-in theaters and various other outdoor events by extending forwardly and upwardly from the roof of the vehicle to protect the windshield area of the vehicle against adverse weather conditions and thus provide clear forward viewing for the vehicle occupants.

The principal objects of the invention are:

To provide a visor of the character described in the form of a single unit which can be readily mounted on the roof of a vehicle with a minimum of effort into a secure position against wind or other elements.

To provide a device of the character described comprising a light weight frame covered with strong, durable plastic material and removably attached to the vehicle top by permanent magnets carried by the covering.

To provide a visor of the character described which may be made in two sections hingedly interconnected so that the visor may be entirely collapsed into compact form or the sections adjustable and lockable in any angular relation to each other or to the vehicle windshield. This adjustable feature has a further advantage of providing protection for the windshield against snow, ice, and frosting conditions by swinging the forward section of the visor down into facial contact with the windshield when the vehicle is parked outdoors.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a passenger vehicle equipped with a visor made in accordance with my invention, and illustrating diagrammatically and generally the range of vision of the occupants of the vehicle.

FIGURE 1A is a side elevational view of an object such as a movie screen or other object within the visual range of the vehicle occupant.

FIGURES 2 and 3 are, respectively, top and side elevational views of the visor, on a slightly enlarged scale, removed from the vehicle.

FIGURE 4 is a detail view on an enlarged scale of a modified form of the invention including means hingedly interconnecting the front and rear sections of the visor to render them either entirely collapsible into compact form or adjustable and lockable in angular relation to each other.

FIGURE 5 is a side elevational view of FIGURE 4.

FIGURE 6 is a sectional detail view on an enlarged scale taken approximately along the line 6—6 of FIGURE 2, and FIGURE 7 is a detail perspective view on an enlarged scale of a typical hold-down magnet for attaching the visor to the vehicle roof.

With continuing reference to the drawing wherein like reference numerals designate like parts, numeral 1 indicates generally a passenger vehicle having a top 2 and a windshield 3, through which an occupant's ordinary forward range of vision is indicated by broken lines 4 and 5 toward a remote object such as a motion picture screen 6 or some other object or area of interest.

The preferred embodiment of visor in accordance with my invention comprises a U-shaped frame 10, of light weight metal tubing, divided into a front section 11 and a rear section 12 by a transverse tubular member 13 secured to the side members of the U-frame by T-fittings 14.

Each visor section may be covered with a separate sheet of plastic indicated respectively at 16 and 17 or, if preferred, both sections can be covered by a single sheet. In either case the covering is wrapped around the tubular frame members and secured thereto as by stitching 18 (FIG. 6) or by spring clips or light weight clamping elements (not shown), if desired, as a convenience in removing or replacing the covering. Although any grade of sheet plastic may be utilized, I prefer a type now marketed under the name of "Bisqueen film" containing nylon webbing which renders it strong and durable for the purpose intended.

For removably securing the visor unit to the roof of a vehicle I provide the rear section 12 with a series of permanent magnets 20, preferably of the type adapted for use as drapery weights (FIG. 7) having two openings 21 therethrough for convenient attachment, as by stitching 22 or any other suitable means, to the plastic covering 17 of the rear section.

With the forward visor section 11 downwardly and rearwardly inclined (FIG. 1) rain water run-off will gravitate onto the vehicle roof 2 and down the conventional drain-strips or molding 24.

In the modification illustrated in FIGURES 4 and 5, the forward visor section 11A is separate and inset from the rear section 12A. The inner ends of the frame of the forward section are secured to T-fittings 14A and thereby interconnected by the transverse tubular member 13A. The inner ends of the rear section are flattened as shown, and thereat hingedly attached as at 25 to the T-fittings 14A. Both sections are thus lockable by thumbscrews 26 in any adjusted position relative to each other or foldable into compact flat formation with the forward section 11A nested within the rear section 12A.

What I claim is:

1. A windshield visor for a vehicle having a metal roof top and a windshield,
    said visor comprising a normally substantially horizontally disposed U-shaped frame having a forward section and a rearward section defined by a transverse member,
    means interconnecting the ends of said transverse member to said sides of the frame,
    a covering of plastic material secured to said forward and rearward sections of the frame by overlapping marginal portions of said material interconnected by stitching,
    a plurality of spaced apart permanent magnets disposed upon the top surface of said covering of said rearward section of the visor and having openings therethrough for securement by stitching to said covering, whereby said visor is removably secured to said metal roof of the vehicle by said magnets.

2. A windshield visor as claimed in claim 1 wherein said means interconnecting said transverse member to the sides of said frame include hinge means carried by said forward section whereby the latter is foldable rearwardly to overlie said rearward section of the frame.

References Cited

UNITED STATES PATENTS

| | | | |
|---|---|---|---|
| 1,619,879 | 3/1927 | Nakagawa | 296—95 |
| 2,743,957 | 5/1956 | Sherman | 296—95 |
| 2,897,002 | 7/1959 | Yovich | 296—95 |
| 3,123,394 | 3/1964 | Corsetti | 296—95 |
| 3,352,599 | 11/1967 | Francis | 296—95 |

LEO FRAGLIA, Primary Examiner

J. A. PEKAR, Assistant Examiner

U.S. Cl. X.R.

160—368